United States Patent [19]

Wilson et al.

[11] Patent Number: 4,518,622

[45] Date of Patent: May 21, 1985

[54] DRY MIX FOR PREPARATION OF PIE AND PASTRY FILLINGS

[75] Inventors: Mildred N. Wilson, Wilton; Robert L. Danielson; Peter M. Bosco, both of Brookfield Center, all of Conn.; Wayne L. Steensen, Newark, Del.

[73] Assignee: Nabisco Brands, Inc., Parsippany, N.J.

[21] Appl. No.: 595,263

[22] Filed: Mar. 30, 1984

[51] Int. Cl.$^3$ ..................... A23L 1/187; A23L 1/195
[52] U.S. Cl. .................................. 426/578; 426/579; 426/661
[58] Field of Search ................. 426/578, 579, 661

[56] References Cited

U.S. PATENT DOCUMENTS

| | | | |
|---|---|---|---|
| 3,949,104 | 4/1976 | Cheng et al. | 426/578 |
| 3,955,009 | 5/1976 | Eskritt | 426/578 |
| 4,228,199 | 10/1980 | Chiu | 426/578 |
| 4,388,337 | 6/1983 | Cawdron | 426/579 |
| 4,465,702 | 8/1984 | Eastman | 426/578 |

*Primary Examiner*—Jeanette Hunter
*Attorney, Agent, or Firm*—Richard Kornutik

[57] ABSTRACT

A dry particulate mix comprised of a sugar component, a starch component and additional minor amounts of appropriate flavorants, colorants, acidulants and the like, which can be hydrated in a room temperature (or cold) aqueous medium to directly and rapidly form, without need for heating or reliance upon an independent or auxiliary gelation system, a firm, gelled mass suitable for use as a filling for pies, tarts or other pastry products. The starch component comprises a quick-setting, cold-water swellable starch, preferably derived from corn starch, possessing specified properties of solubility, pH, gel formation and gel strength. Also disclosed is a dry mix particularly adapted for preparation of a lemon pie filling.

10 Claims, No Drawings

DRY MIX FOR PREPARATION OF PIE AND PASTRY FILLINGS

BACKGROUND OF THE INVENTION

The present invention relates to the preparation of pies and other filled pastry products and, in particular, to the provision of a dry mix which can be utilized by a consumer for making a filling for such products without the need for cooking steps.

Pies and other like filled pastry products such as tarts have for many years been favored dessert and snack items. These products generally comprise a baked pie shell or pastry shell in which a flavored filling is poured and which may thereafter be topped with either a crust, cream topping, fruit topping, or the like. In certain instances, the completely assembled pie thereafter requires baking while in other cases the filling itself is pre-cooked before being poured into the shell.

A particularly favored class of pies are those in which the filling is a starch-based, gelled or set pudding-like mass. Examples of such pies are lemon pies, lemon meringue pies, coconut cream pies, chocolate cream pies, vanilla cream pies, banana cream pies and the like. These pies are characterized by the fact that the filling has a pleasant smooth eating texture while also possessing sufficient strength and rigidity to enable it to cut cleanly for the serving of individual pie pieces and to enable individual pie pieces to stand on their own without excessive running or collapse of the filling.

In typical recipe preparations of such pies, a filling is prepared by cooking (boiling) a mixture of sugar, starch and water (together with flavorants and/or colorants and other additives peculiar to the particular pie in question as, for example, the use of egg in lemon pie fillings to contribute to the unique texture thereof), during which process the starch granules undergo progessively increasing stages of water absorption, swelling and loss of birefringence, along with leaching out of soluble portions of the starch. The aqueous mixture increases greatly in viscosity and, upon cooling (i.e., after pouring into a pie shell) sets to a firm gel structure.

In this present age of consumer convenience, efforts constantly are being made to provide products which can be prepared and consumed with a minimum of effort. In the field of pies, tarts and the like, these efforts have been directed toward presentation to the consumer of, for example, frozen complete products requiring no more than thawing or heating prior to consumption. Another form of convenience pie product of the starch-based filling type is predicated upon the provision of a dry filling mix containing the full complement of sugars, starch, flavorings, etc. which can be admixed with water or other aqueous medium and cooked to provide a filling which can be poured into a pie shell and which will set upon cooling.

Still further, it has been perceived as desirable to provide the consumer with a mix which can be reconstituted to form a set or gelled starch-based filling without any need for cooking, i.e., using ordinary tap water, cold water, cold milk or the like. Products of this type present the ultimate consumer convenience, but pose difficult formulation problems. This is particularly true with respect to the starch component of the filling since, absent some form of manufacturing or post-manufacturing modification, typical native starch is incapable of achieving the requisite degree of swelling, absorption, and loss of birefringence in unheated media to produce a viscous gelled or set product in any reasonable period of time required for convenience food items.

Starches are, of course, known which, through means of modification, can form relatively viscous mixtures in aqueous media without need for extensive cooking. Some starches of this type have been employed in so-called instant pudding products, but these products nevertheless rely upon an independent gelling system based upon milk proteins and alkali metal (e.g., calcium) pyrophosphates, orthophosphates and the like. It would be most desirable to be able to provide a pie or tart filling mix which could be reconstituted without cooking and without need for an independent gelatin system to form a firm gelled or set product in a relatively short period of time.

Another difficulty in preparing products of the type in question is the fact that even if starches are provided which are capable of achieving sufficient absorption and swelling in cold or room temperature media to form a set product, the very modifications required to achieve this result can adversely affect other desired textural properties sought to be imparted by the starch.

A still further difficulty relates to the interaction of ingredients which occurs when a complete filling mix is sought to be provided. Starches which may possess the capability of forming a set gel in admixture with aqueous media per se could lose this property (or exhibit it to a lesser degree) when the admixture further contains additional ingredients. This is particularly true for fillings which contain acidic ingredients such as found in lemon, lime or other citrus-flavored fillings.

With respect to the above-mentioned lemon, lime or other citrus-flavored fillings, another difficulty is encountered with respect to the desirable textural attributes contributed by eggs. Thus, in conventional recipes for cooked lemon fillings (e.g., for preparing lemon meringue pies), eggs are included to provide a desired rich, thick filling. As is well known, however, great care and special steps must generally be taken in order to avoid curdling of the egg in the presence of the acidic components of the recipe. In formulating a complete dry mix for preparing a lemon filling, therefore, a dried egg component might be included to provide the texture achieved in homemade fillings. However, dried egg products generally do not have keeping qualities of the type required for use in a dry filling mix and, moreover, hydration of the dry mix for preparation of the filling may lead to the noted curdling problem.

SUMMARY OF THE INVENTION

It is an object of the present invention to provide a starch-based, substantially dry mix which can be mixed with water or other aqueous media and, without need for cooking the admixture, result in a firm gelled product suitable for use as a pie or tart filling.

A further object of the invention is to provide a starch-based mix of the type described which achieves a firm gelled state without need for the additional presence of an independent gelation system.

Still a further object of the invention is to provide a starch-based mix of the type described which achieves a firm gelled state within a reasonably short time after admixture with aqueous medium.

Yet another object of the present invention is to provide a starch-based mix of the type described which produces a firm gelled pie filling which exhibits a required degree of smoothness in texture and eating qualities while at the same time exhibiting sufficient viscosity, strength and firmness to produce a clean cutting ability and individual piece stability.

A further object of the present invention is to provide a starch-based mix of the type described which exhibits the desired gelling and textural properties in the presence of acidic ingredients.

An additional object of the invention is to provide a substantially dry, starch-based mix for use in preparing the filling portion of a lemon pie.

These and other objects are attained by the provision of a substantially dry mixture of particulate ingredients comprising a sugar component and a starch component, the starch component itself comprising a particular starch hereinafter described in detail, along with optional flavoring and coloring ingredients, which mixture possesses the capability of being mixed with an aqueous medium to provide, without need for heating, a thickened, gel-like mass suitable for use as a pie, tart or other pastry filling.

Particular further aspects of the invention include a dry mixture of particulate ingredients as defined above and further comprising one or more acidic ingredients which make the resultant thickened gel-like mass prepared therefrom particularly suitable for use as a filling in citrus-flavored pies, tarts or other pastry products.

The starch component of the filling mix is a rapid gelling, cold-water swelling starch, preferably a corn starch, which possesses the following characteristics:

formation of a gel within approximately fifteen (15) minutes in a well-stirred mixture (held at about 70° F. to 75° F. after mixing) consisting of about 6% of the starch, about 70% water at room temperature and about 24% of a sugar component which comprises a high fructose corn syrup (55% fructose; pH 3.5; 77% solids) (percents by weight);

utilizing the foregoing sample mixture, attainment of a gel strength (as defined hereinafter) of at least about 90 grams and, preferably, from about 110 to about 130 grams, after about fifteen (15) minutes;

a percentage of cold-water solubles of at least about 70% by weight; and a pH in the range of from about 4.0 to about 6.0 for a 10% solution/suspension of the starch in room temperature distilled water.

It has been found that a starch which meets these criteria is particularly well-suited for use as a component in dry mixes capable of being formed by addition thereto of an aqueous medium, into firmly set pie or tart fillings without need for cooking, wherein the starch is present in the dry mixture in an amount which produces a filling having from about 3.0% to about 10% of the starch by weight of the total ingredient weight of the filling (including aqueous ingredients), and preferably from about 4% to about 7% starch on the same basis.

The composition of the dry mix per se generally will constitute from about 55 to about 85% of a sugar component, 10 to about 35% (preferably 15 to about 25%) of the starch component, and various amounts of appropriate flavors, colors and other functional ingredients as described hereinafter.

As used herein, "dry" or "substantially dry", when characterizing compositional mixtures, is intended to describe compositions having a sufficiently low moisture content so as to be capable of prolonged storage without spoilage and also so as to remain in a substantially free-flowing particulate form over extended storage periods. Typically, the moisture content of such compositions will be about 5% or less (generally from about 1% to 3%) on a weight basis.

Pie or tart fillings made from the dry mixes of the invention are characterized by an extremely smooth eating texture which is neither gummy nor slimy, while at the same time possessing excellent cutting ability and structural integrity.

In view of the quick-setting nature of the filling, the making of pies or tarts therefrom is greatly facilitated not only from the point of view of rapid preparation of the filling portion of the pie, but also the ability to place a topping thereon within a short time after addition of the filling to a pie or pastry shell without concern for undesired intermixing of filling and topping.

While the preferred embodiment of the invention contemplates hydration of the pie filling mix with cold or room temperature water, it of course is possible to utilize hot or boiling water or other aqueous medium should this be desired by the consumer.

Further details regarding the present invention are set forth in the succeeding sections of this application, including formulation of a particularly preferred lemon pie filling which does not require the use of egg. As will be appreciated, many of the details presented are simply for the purpose of aiding understanding of the invention and illustrating the breadth of its applicability, and are not to be taken as limiting the otherwise expressed scope of the invention.

DETAILED DESCRIPTION OF THE INVENTION

According to the present invention, a dry mix for preparing a pie or tart or other pastry filling is provided which comprises a particulate mixture of a sugar component, a starch component and other appropriate flavorants, colorants, acidulants or the like. The mix is adapted to be hydrated in an aqueous medium, preferably water, at a temperature of from about room temperature (approximately 70° F.) down to about 40° F., to directly and rapidly form a viscous mass which, without aid of an independent gelling system and without need for heating or cooking, will set up as a firm gelled product suitable for use as a pie or tart pastry filling. The transformation of the hydrated mixture to a firm gelled structure, while rapid, is progressive and thus permits sufficient time to pour or otherwise add the mixture into a suitable pie or pastry shell before the mixture thickens and sets to a point where such pouring or addition would be difficult to effect.

The starches which are suitable for use in the present invention, and which result in the desirable setting and texture benefits achieved upon hydration of the dry mix, are characterized by possession of a number of properties which can be tested independent of the entirety of the filling mix.

A first property of the starch is that a 10% slurry or suspension thereof in room temperature distilled water have a pH in the range of from about 4.0 to about 6.0, a measurement which can be made utilizing any standard pH meter.

In addition to the foregoing, the starch employed should have a cold-water solubles content of at least about 70% by weight. The method employed for determining this parameter involves intimately mixing a known weight of starch with a known volume of cold (50° F.) distilled water and centrifuging the mixture for fifteen (15) minutes at about 3000 rpm. A fixed volume of supernatant is then evaporated to dryness, and the residue then calculated as soluble solids.

The essential hydration, thickening and gelling properties of the starch are tested using a mixture of about 70% water, about 24% of a sugar consisting of high fructose corn syrup (55% fructose; pH 3.5; 77% solids), and about 6% of the starch. In such mixtures, using water at 70° F., the starch for use in the present invention must produce a gel (held at from about 70° F. to 75° F.) having a gel strength of at least about 90 grams (and preferably from about 110 to about 130 grams) within about fifteen (15) minutes after mixing of the ingredients.

As utilized herein, "gel strength" is a measure of the yield point of the starch gel prepared as set forth above, and is determined utilizing a Voland/Stevens LFRA Texture Analyzer using a ½ inch AOAC spindle, a penetration distance of 20 mm and a speed of 1 mm/second. In this test, the force required to achieve the noted degree of penetration of the spindle in the gel in the noted amount of time is recorded as deflections on a chart in terms of gram weight. The weight in grams at the point of highest deflection is taken as the gel strength.

As earlier noted, these properties are tested independent of the filling of the present invention, using standardized ingredient mixtures. The ingredients (and their proportions) of these standardized mixtures are not intended to be limitations with respect to the composition of the filling mix claimed herein.

Starches possessing the foregoing characteristics are commercially available. One particularly preferred starch of this type is a corn starch manufactured by A. E. Staley Manufacturing Company, Decatur, Illinois, under the designation MIRA-GEL F4-463.

As earlier noted, the quantity of starch in the dry filling mix is such that the eventual gelled filling contains from about 3% to about 10% of the starch by weight of the overall weight of all ingredients (including aqueous ingredients) of the filling, and preferably in the range of from about 4% to about 7% by weight. In general, increased levels of starch will produce a firmer filling (high gel strength) and levels above about 10% generally will be found to produce fillings which are undesirably firm to the point where they set or thicken too rapidly and their eating properties do not produce the desired smooth texture. Starch levels below about 3% generally will be found to result in insufficient thickening of the filling and consequent poor cutting ability and individual piece structural integrity.

Apart from the starch relied upon for gelation of the filling, the dry mix may also contain additional thickening or stabilizing agents such as pregelatinized starches, hydrophilic colloids and the like. Generally, however, use of these materials is not desired since they make control over gelation and thickening somewhat more difficult and increase the cost of the product.

The sugar component of the dry filling mix of this invention can be any mono-, di-, or oligosaccharide, or mixtures thereof, capable of providing the desired degree of sweetness and body to the filling and capable of being used in a form compatible with the substantially dry, free-flowing, particulate nature of the mix. The sugar component also aids in dispersing the various ingredients in the aqueous medium and promotes rapid mixing free of lumps. Among the suitable sugars are sucrose, dextrose, highly converted dry corn syrup solids, high fructose corn syrup solids and other sugars of commerce, as well as mixtures thereof. Artificial sweeteners also may be employed in the dry mix to provide some or all of the desired sweetness in the filling. Use of such sweeteners (e.g., aspartame, saccharin) will require that suitable non-sweet bulking agents be employed to replace solids lost by substitution of these sweeteners for all or part of the sugar.

In terms of the dry filling mix, the sugar component (sugars per se or combination of non-sweet bulking agents and artificial sweeteners) will be present in an amount of from about 55 to 85% by weight of the overall dry mix, and preferably from about 70 to 80% by weight. In terms of the filling itself (including aqueous ingredients) the sugar component will be present in an amount of from about 10% to about 35% by weight of the filling. The ratio of gelling starch component to sugar in the filling will preferably be in the range of from about 1:7 to 1:3.

The most preferred filling mix of the present invention will be one which employs sucrose as the sugar component. As discussed in further detail hereinafter, the ability to form a rapid, firm, gelled filling from an aqueous sucrose/starch mixture without cooking and without need for an independent gelation system is of significant importance and surprising.

The dry filling mix of the present invention will also contain suitable amounts of flavorants, colorants and the like as may be required to produce a filling of a particular type, for example, lemon filling, lime filling, vanilla filling, coconut filling, banana filling, and the like. For fillings such as lemon, lime or other citrus filling, the dry mix typically will contain a suitable amount of a food-grade acidulant for purposes of producing the characteristic tartness of such fillings. A particularly preferred acid is adipic acid which can be employed, based on the overall weight of the filling (including aqueous ingredients), at levels of from about 0.5 to about 2.0% by weight. Other suitable additives are citric acid or salts (e.g., sodium) of citric acid. It also may be useful to provide in the mix minor amounts of oils or emulsifiers to aid in dispersion of the dry ingredients in the aqueous medium and to provide additional textural benefits.

With respect to the fillings containing acidic ingredients, it has surprisingly been found that the dry mixes of the present invention can be made egg-free (as well as, e.g., milk-free) and yet still provide fillings having a desired rich, thick texture closely approximating cooked, homemade fillings made using egg (and/or milk). As a consequence, it is possible to eliminate potential problems with respect to the interaction of egg or milk and the acidic components during preparation of the fillings, as well as with respect to the stability qualities of dried egg or milk products.

Wholly apart from the functionality of acidulants in terms of the provision of the tartness required for particular types of flavored fillings, the presence in the fillings of acids (and/or the attainment of a particular pH value through use of acids or acid/buffer systems) is at present believed to be of importance in terms of the gelation and textural characteristics attained using the starch component employed in the present invention. In particular, it is at present preferred to formulate the dry filling mix (using suitable acids and, if necessary, buffers) so as to achieve a final filling product having a pH in the range of from about 2.0 to about 5.0, and most preferably from about 3.5 to about 4.5. Our findings to date indicate that attainment of these values may be of particular importance when the sugar employed in the dry mix is sucrose. Another important finding is that, contrary to the action of many starches in the presence of acids, the gelled mass prepared employing a starch according to the present invention exhibits excellent resistance to weeping or syneresis for extended periods of time.

Thus, in the preferred execution of the invention, the dry mix will contain sufficient acid (generally from about 0.5% to about 2.0% by weight, based on the overall filling weight (including aqueous ingredients)) and, if required, food-grade buffer, to produce a final filling pH as earlier set forth.

The dry filling mix of the present invention is in particulate or finely-divided form in order to promote free-flowability and more rapid dispersion upon addition to aqueous media. Typically the individual ingredients of the mix are each individually sub-divided to the appropriate size and then dry blended to form the filling mix. Any liquid components (e.g., oils, flavors) can be plated onto one or more of the individual components (e.g., the sugar) prior to dry blending or can be sprayed, plated or otherwise admixed to a mixture of all other solid components. It also is possible to first pre-blend all ingredients, regardless of particle size, and thereafter sub-divide the entire mixture to a suitable form. Generally, the particle size distribution of all individual ingredients will be relatively the same if possible in order to minimize particle segregation in the package and promote even dispersibility. A typical particle size of the ingredients will be such that at least 90% thereof is capable of passing through a No. 30 U.S. Standard Screen.

In a particularly preferred embodiment of the invention, a lemon or lime-flavored filling mix is provided containing sucrose and the earlier-described starch component along with a suitable lemon or lime flavor and yellow or green colorants, food-grade acidulants, and a food-grade buffer salt. As earlier-noted, the most preferred form of a product of this type is one which does not contain any egg or milk ingredients.

The preferred filling mix of the present invention also is characterized by the properties of viscosity and texture attained when the mix is hydrated in an aqueous medium. Thus, the hydrated mix will exhibit penetration values (product temperature=50° F.; cone weight=29.8 grams) of less than about 230 (mm) when measured two hours after initial mixing; less than about 260 (mm) when measured one hour after initial mixing; and less than about 300 (mm) when measured thirty minutes after initial mixing. Particularly preferred fillings will exhibit values of from about 240 to 290 mm after thirty minutes, from about 210 to about 250 mm after one hour, and from about 190 to about 220 mm after two hours.

The hydrated mix will exhibit viscosity values, again measured at thirty minutes, one hour and two hours, of at least about 4,000 cp, 26,000 cp and 46,000 cp, respectively (measured at 50° F. with a Brookfield Helipath Viscometer, Model RVT, using a 2.0 cm T-bar (type "D") and a speed setting of 10 rpm). Particularly preferred mixes will produce hydrated mixtures having viscosity values, again measured at thirty minutes, one hour and two hours, of at least about 16,000 cp, 40,000 cp and 60,000 cp, respectively.

Preferred embodiments of the invention are illustrated in the following example:

EXAMPLE

The ingredients listed below, in the weight percentage ranges indicated, are blended together to form dry mixes for preparing lemon pie fillings.
Granular Sugar: 75–80
Corn Starch (F4-463): 15–19
Acid: 2–3
Natural Lemon Flavors: 1–1.5
Sodium Citrate: 0.40–0.70
Vegetable Oil: 0.10–0.15
Colorants: Balance The contents of the mix (total weight, 212 grams) are blended together with two cups of cold (50° F.) water using an electric mixer for about four (4) minutes, and the mixture is then poured into a 9-inch pre-prepared, baked pie shell. While the filling and shell are set aside for fifteen (15) minutes, a meringue topping is prepared The topping is then spooned over the surface of the filling in the pie shell, and the completed pie is then chilled for about three (3) hours.

A lemon meringue pie prepared in this manner closely resembles the taste and textures of a homemade cooked starch pie, and exhibits excellent eating characteristics as well as excellent clean cutting characteristics and structural integrity. In terms of the filling itself, the pH thereof is about 4.2; penetration values are about 207 mm, 234 mm and 267 mm at two hours, one hour and thirty minutes; and viscosity values are about 20,000 cp, 48,000 cp and 72,000 cp at thirty minutes, one hour and two hours.

In the foregoing description of the invention, the dry mix is set forth as being a "complete" mix in the sense that all that is required for preparation of the pie or pastry filling is the addition of aqueous medium. As will be well appreciated by those of skill in the art, however, it is possible to formulate the dry mix such that the as-sold or as-distributed package thereof contains less than all the ingredients (or amounts thereof) contemplated for making the pie or pastry filling. For example, it may be desirable to package and sell to consumers a dry mix containing less than the required or desired amount of sugar, with directions to the consumer to add additional sugar when adding the dry mix ingredients into an aqueous medium to form the pie or pastry filling. In such cases, of course, the various ingredients or percentages of ingredients of the dry mix according to the invention—which are based upon a complete mix—will not necessarily be reflected in the as-sold or as-distributed package, but will correspond to the ingredients and percentages based upon the complete ingredients (from the package plus added ingredients) admixed with aqueous medium.

What is claimed is:

1. A dry mix capable of being hydrated in an aqueous medium to form, without need for cooking, a firm gelled mass suitable for use as a pastry or pie filling and having textural and organoleptic properties similar to those possessed by a cooked, starch-based filling, said mix comprising a substantially dry, particulate mixture of (a) a sugar component consisting essentially of sucrose; (b) a starch component; (c) a sufficient quantity of food-grade acidulant to achieve a pH in the range of from about 2.0 to about 5.0 in the hydrated filling; and (d) appropriate amounts of flavorants and/or colorants;

and wherein said mix does not contain a gelation system other than said starch component;

and wherein said starch component comprises a gellable starch in an amount sufficient to provide from about 3% to about 10% by weight thereof in said hydrated filling and sufficient to convert the admixture of said dry mix and an aqueous medium having a temperature in the range of from about 40° F. to about 70° F. to a firm gelled mass, without cooking, having the following properties measured at 50° F. and after thirty minutes, one hour and two hours, respectively: penetration depth of less than about 300 mm, less than about 260 mm and less than about 230 mm, and viscosity values of at least about 4,000 cp, at least about 26,000 cp and at least about 46,000 cp;

and wherein said gellable starch itself is a cold-water swellable starch which has the following properties as determined in independent tests using the standardized ingredient mixtures indicated: a pH of from about 4.0 to about 6.0; a percentage of cold-water solubles of at least about 70% by weight; and a thickening and gelation capacity capable of converting a 70° F. mixture of about 6% of said starch, about 70% water and about 24% of a sugar consisting of a high fructose corn syrup having 55% fructose and a solids content of about 77%, to a mass having a gel strength of at least about 90 grams within about fifteen (15) minutes.

2. The dry mix according to claim 1 wherein the amount of said gellable starch is sufficient to provide from about 4% to about 7% by weight thereof in said hydrated filling.

3. The dry mix according to claim 1 wherein said sugar component consists solely of sucrose, and wherein said dry mix contains a sufficient amount of food-grade acidulant to achieve a pH in the range of from about 3.5 to about 4.5 in the hydrated filling.

4. A dry mix capable of being hydrated in an aqueous medium to form, without need for cooking, a firm gelled mass suitable for use as a lemon and/or lime-flavored pastry or pie filling and having textural and organoleptic properties similar to those possessed by a cooked, starch-based lemon and/or lime-flavored filling, said mix comprising a substantially dry, particulate mixture of (a) a sugar component consisting of sucrose; (b) a starch component; (c) a sufficient quantity of food-grade acidulant and a food-grade buffer salt to achieve a pH in the range of from about 3.5 to about 4.5 in the hydrated filling; and (d) appropriate amounts of lemon and/or lime flavorants and/or colorants;

and wherein said mix does not contain a gelation system other than said starch component and contains no egg or milk ingredients;

and wherein said starch component comprises a gellable starch in an amount sufficient to provide from about 3% to about 10% by weight thereof in said hydrated filling and sufficient to convert the admixture of said dry mix and an aqueous medium having a temperature in the range of from about 40° F. to about 70° F. to a firm gelled mass, without cooking, having the following properties measured at 50° F. and after thirty minutes, one hour and two hours, respectively: penetration depth of less than about 300 mm, less than about 260 mm and less than about 230 mm, and viscosity values of at least about 4,000 cp, at least about 26,000 cp and at least about 46,000 cp;

and wherein said gellable starch itself is a cold-water swellable starch which has the following properties as determined in independent tests using the standardized ingredient mixtures indicated: a pH of from about 4.0 to about 6.0; a percentage of cold-water solubles of at least about 70% by weight; and a thickening and gelation capacity capable of converting a 70° F. mixture of about 6% of said starch, about 70% water and about 24% of a sugar consisting of a high fructose corn syrup having 55% fructose and a solids content of about 77%, to a mass having a gel strength of at least about 90 grams within about fifteen (15) minutes.

5. A method for making a pie or pastry filling having textural and organoleptic properties similar to those possessed by a cooked, starch-based filling, said method comprising admixing with an aqueous medium at a temperature of from about 40° F. to about 70° F. (a) a sugar component consisting essentially of sucrose; (b) a starch component; (c) a sufficient quantity of food-grade acidulant to achieve a pH in said pie or pastry filling in the range of from about 2.0 to about 5.0; and (d) appropriate amounts of flavorants and/or colorants, in the absence of any gelation system other than said starch component, and thereafter permitting said admixture to set to a firm gelled mass, and wherein:

said starch component comprises a gellable starch in an amount sufficient to provide from about 3% to about 10% by weight thereof in said filling and sufficient to convert the admixture of said dry mix and aqueous medium to a firm gelled mass, without cooking, having the following properties measured at 50° F. and after thirty minutes, one hour and two hours, respectively: penetration depth of less than about 300 mm, less than about 260 mm and less than about 230 mm, and viscosity values of at least about 4,000 cp, at least about 26,000 cp and at least about 46,000 cp;

said gellable starch itself is a cold-water swellable starch which has the following properties as determined in independent tests using the standardized ingredient mixtures indicated: a pH of from about 4.0 to about 6.0; a percentage of cold-water solubles of at least 70% by weight; and a thickening and gelation capacity capable of converting a 70° F. mixture of about 6% of said starch, about 70% water and about 24% of a sugar consisting of a high fructose corn syrup having 55% fructose and a solids content of about 77%, to a mass having a gel strength of at least about 90 grams within about fifteen (15) minutes.

6. The method according to claim 5 wherein the amount of said gellable starch is sufficient to provide from about 4% to about 7% by weight thereof in said filling.

7. The method according to claim 5 wherein said sugar component consists solely of sucrose, and wherein said admixture contains a sufficient amount of food-grade acidulant to achieve a pH in the range of from about 3.5 to about 4.5 in said admixture.

8. The pie or pastry filling prepared in accordance with the method of claim 5.

9. A method for making a lemon and/or lime-flavored pie or pastry filling having textural and organoleptic properties similar to those possessed by a cooked, starch-based lemon and/or lime filling, said method comprising admixing with an aqueous medium at a temperature of from about 40° F. to about 70° F. (a) a sugar component consisting of sucrose; (b) a starch component; (c) a sufficient quantity of food-grade acidulant and a food-grade buffer salt to achieve a pH in said pie or pastry filling to the range of from about 3.5 to about 4.5; and (d) appropriate amounts of flavorants and/or colorants, in the absence of any gelation system other than said starch component and in the absence of egg or milk ingredients, and thereafter permitting said admixture to set to a firm gelled mass, and wherein:

said starch component comprises a gellable starch in an amount sufficient to provide from about 3% to about 10% by weight thereof in said filling and sufficient to convert the admixture of said dry mix and aqueous medium to a firm gelled mass, without cooking, having the following properties measured at 50° F. and after thirty minutes, one hour and two hours, respectively: penetration depth of less than about 300 mm, less than about 260 mm and less than about 230 mm, and viscosity values of at least about 4,000 cp, at least about 26,000 cp and at least about 46,000 cp;

said gellable starch itself is a cold-water swellable starch which has the following properties as determined in independent tests using the standardized ingredient mixtures indicated: a pH of from about 4.0 to about 6.0; a percentage of cold-water solubles of at least 70% by weight; and a thickening and gelation capacity capable of converting a 70° F. mixture of about 6% of said starch, about 70% water and about 24% of a sugar consisting of a high fructose corn syrup having 55% fructose and a solids content of about 77%, to a mass having a gel strength of at least about 90 grams within about fifteen (15) minutes.

10. The pie or pastry filling prepared in accordance with the method of claim 9.

* * * * *